(12) United States Patent
Arataki et al.

(10) Patent No.: US 6,256,274 B1
(45) Date of Patent: Jul. 3, 2001

(54) DATA ERASURE PREVENTING METHOD AND CIRCUIT THEREOF AND OPTICAL DISC APPARATUS MOUNTING THE SAME

(75) Inventors: Yuji Arataki, Tokyo; Tetsuji Nakazawa, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/117,997

(22) Filed: Sep. 8, 1993

(30) Foreign Application Priority Data

Sep. 9, 1992 (JP) .................................................. 4-268187

(51) Int. Cl.[7] ................................. G11B 7/00; G11B 3/90
(52) U.S. Cl. ...................................... 369/44.28; 369/44.25
(58) Field of Search .............................. 369/44.33, 44.31, 369/44.32, 44.35, 44.38, 54, 53.14, 44.27, 44.28, 53.28

(56) References Cited

U.S. PATENT DOCUMENTS

| | | | |
|---|---|---|---|
| 4,669,072 | * 5/1987 | Miura et al. | 369/44.33 X |
| 4,703,468 | * 10/1987 | Baba et al. | 369/44.32 |
| 4,730,290 | 3/1988 | Takasago et al. | 369/32 |
| 4,748,608 | 5/1988 | Matsumoto et al. | 369/43 |
| 4,759,006 | 7/1988 | Kolshi et al. | 369/44.33 |
| 5,012,461 | * 4/1991 | Yoshida et al. | 369/44.33 |
| 5,224,085 | * 6/1993 | Shinkai et al. | 369/44.33 |
| 5,224,087 | 6/1993 | Maeda et al. | 369/54 |

FOREIGN PATENT DOCUMENTS

| | | |
|---|---|---|
| 0 407 573 A1 | 1/1991 | (EP) . |
| 2 087 628 | 5/1982 | (GB) . |
| 84-011546 | 5/1984 | (JP) . |
| 63-121137 | * 5/1988 | (JP) .................................. 369/44.33 |

OTHER PUBLICATIONS

Patent Abstracts of Japan, vol. 9, No. 127 (P–360), May 31, 1985 & JP–A–60 010 429 (TOSHIBA), Jan. 19, 1985.

* cited by examiner

Primary Examiner—Thang V. Tran
Assistant Examiner—Kim-Kwok Chu
(74) Attorney, Agent, or Firm—Oblon, Spivak, McClelland, Maier & Neustadt, P.C.

(57) ABSTRACT

When a data is recorded to a recording medium, a miserasing preventing circuit determines whether or not a track jump is caused by a shock or a scratch. If it is caused by a shock, such as a quantity of light of an optical pick-up is controlled to change a reproducing state, and then the optical pick-up is moved to the rerecording position to start rerecording. As a result, recorded area is not disturbed, and the rerecording control is not performed by a little dust. Thereby, it can be provided an apparatus with high recording efficiency.

12 Claims, 7 Drawing Sheets

DATA ERASURE PREVENTING METHOD AND CIRCUIT THEREOF AND OPTICAL DISC APPARATUS MOUNTING THE SAME

BACKGROUND OF THE INVENTION

1. Field of the Invention

This invention relates to an optical disc apparatus, and more particularly to an improvement of an optical disc apparatus for recording desired information to a disc recording medium through a memory circuit with a large capacity.

2. Description of the Related Art

Conventionally, there is proposed an optical disc apparatus by which desired information is thermo magnetically recorded to an optical magnetic disc through a memory circuit with a large capacity.

More specifically, in this type of the optical disc apparatus, recording information is sequentially stored in a memory circuit and the stored recording information is sequentially read out and recorded to the optical magnetic disc.

In the optical disc apparatus, the recording information is recorded by using pregrooves on the optical magnetic disc as a reference so that a recording track is formed along the pregroove and the recording information is recorded in predetermined cluster units using to the pregroove as a reference.

Further, in the optical disc apparatus, when the discontinuity of the address data is detected while information is recorded, it is determined that atracking jump is caused by a vibration or the like. Then, a quantity of light of an optical beam is changed to the quantity of light for reproduction and thereafter the leading head of the sector, the tracking of which has been jumped, is detected.

With this arrangement, in the optical disc apparatus, the recording information is recorded again with respect to the portion of the recording information which cannot be correctly recorded due to the tracking jump.

For example, U.S. Pat. No. 5,012,461 is known in which, as described above, discontinuity of the address data is detected so as to change a laser power to a power for reproduction.

Further, in such kind of optical disc apparatus, even if the tracking jump occurs, predetermined information can be recorded successively by effectively using a capacity of the memory circuit.

For example, U.S. Pat. No. 5,224,087, filed Aug. 19, 1991 is known, wherein desired data is recorded successively by using the memory circuit.

Above address data is recorded to the optical magnetic disc at a cycle of 13.3 [msec]. So reading address data adjacent to current address data takes 13.3 [msec] at least.

On the contrary, in the event of a tracking jump, the positions of several tens of tracks to which an optical beam is irradiated are changed in 1 to 2 [msec]. Consequently, when tracking jumping is detected based on comparing current address data and previous address data, if controlling it after obtaining a detecting result, the tracking jump has already completed, and thus a problem arises in that recorded data may be erased by mistake before the intensity of the light beam is changed to the quantity of light used in reproduction.

As a method of solving this problem, it is considered a method of detecting a tracking jump based on a tracking error signal could be considered.

More specifically, the track zero-crossing signal is generated by detecting a point changed the signal level of the tracking error signal to a positive side or negative side about a zero level. Further, an off-track signal is generated for detecting the off track by comparing a light reflected from the optical magnetic disc with a predetermined value, and then a tracking jump is detected by using the above two signals.

A different structure from the above detecting method, for example, Japanese Patent Laid-Open No. 11546/1984 is known, in which a track crossing signal is generated by comparing the tracking error signal with predetermined level to detect a tracking jump.

When, however, a tracking jump is detected based on the track zero-crossing signal or the off-track signal, it is determined that a tracking jump has occurred even if a scratch, dust or the like is present on the optical magnetic disc, and thus the recording operation is unnecessarily interrupted and there is a problem that useless control is repeated in recording.

SUMMARY OF THE INVENTION

In view of the foregoing, an object of this invention is to provide an optical disc apparatus, capable of securely and quickly detecting a tracking jump and preventing recorded data from being erased.

The foregoing object and other objects of this invention have been achieved by the provision of an optical disc apparatus 1 for recording desired information D1 to a disc recording medium 2 by irradiating a light beam L1 to the disc recording medium 2, which comprises a tracking error signal generation means 24 for receiving the reflected light of the light beam L1 and generating a tracking error signal based on the reflected light, a comparison means 24 for outputting the comparison result TZC between the tracking error signal and a predetermined reference level, an off-track signal generation means 24 for generating an off-track signal OFTRK the signal level of which is changed when the light beam jumps off a track, based on the reflected light, latch means 36, 38 for latching the off-track signal OFTRK using the comparison result TZC as a reference and outputting a latch signal S3, count means 40, 42 for counting the latch signal S3 and outputting a counting result S5, reset means 50, 52 for initializing the count means 40, 42 in a predetermined period after the latch signal S5 rises up, decoders 44, 46, 48 for outputting a tracking jump detection signal SHOCK by determining that the light beam L1 has jumped off a target track when the counting result S5 reaches a predetermined value, and a light quantity change means 30 for changing a quantity of light of the light beam L1 to the quantity of light for reproduction based on the tracking jump detection signal SHOCK when the light beam L1 jumps off the target track.

Further, there is provided an optical disc apparatus for recording desired information D1 on a disc recording medium 2 by irradiating an optical beam L1 to the disc recording medium 2, which comprises a tracking error signal correction means 24 for receiving the reflected light of the light beam L1 and creating a tracking error signal based on the reflected light, a comparison means 24 for outputting the comparison result TZC of the tracking error signal and a predetermined reference level, an off-track signal generation means 24 for generating an off-track signal OFTRK the signal level of which is changed when the light beam L1 jumps off a track, based on the reflected light latch means 36, 38 for latching the off-track signal OFTRK using the comparison result TZC as a reference and outputting a latch signal S3, count means 40, 42 for counting the latch signal S3 and outputting a counting result S5, a scratch detection means 24 for detecting a scratch on the disc recording medium based on the reflected light and outputting a scratch detection signal DFECT when the light beam L1 scans the scratch, reset means 50, 52 for initializing the count means 40, 42 in a predetermined period after the latch signal S3 rises up as well as initializing the count means 40, 42 based on the scratch detection signal DFECT, decoders 44, 46, 48 for outputting a tracking jump detection signal SHOCK by determining that the light beam L1 has jumped off a target track when the counting result S5 reaches a predetermined value, and a light quantity change means 30 for changing a quantity of light of the light beam L1 to the quantity of light for reproduction based on the tracking jump detection signal SHOCK when the light beam L1 jumps off the target track.

Further, in this invention, the reset means 50, 52 initializes the count means 40, 42 when a quantity of light of the light beam L1 is changed to the quantity of light for reproduction.

Further, in this invention, the light quantity change means 30 includes a light beam modulation means 84 for modulating the light beam L1 by a predetermined frequency and drives the light beam modulation means 84 to modulate the light beam L1 at the same time when a quantity of light of the light beam is changed to the quantity of light for reproduction.

Further, the present invention includes-signal level correction means 84 to 104 for correcting the signal level of the tracking error signal based on a quantity of light of the reflected light and the signal level correction means 84 to 104 change time constants 86, 88, 90 for correcting the signal level when a quantity of light of the light beam is changed to the quantity of light for reproduction.

The off-track signal OFTRK is latched using the comparison result TZC as a reference and when the counting result S5 of the resulting latch signal S3 reaches the predetermined value, the light beam L1 is determined to jump off a target track, and thus tracking jump can be securely and quickly detected, whereby an amount of light of the light beam L1 is changed to the amount of light for reproduction to thereby prevent the erasing by mistake of recorded data.

The counting result is initialized by initializing the count means 40, 42 based on the scratch detection signal DFECT, and thus the detection by mistake of tracking jump can be prevented.

Further, when a quantity of light of the light beam L1 is changed to the quantity of light for reproduction, the detection by mistake of tracking jump can be prevented before it arises during a period before rerecording is started, by initializing the count means 40, 42.

Further, the light beam modulation means 84 is driven at the same time to modulate the light beam L1 to thereby reduce scoop noise.

Further, when a quantity of light of the light beam L1 is changed to the quantity of light for reproduction, the time constants 86, 88, 90 for correcting a signal level are changed to thereby prevent the disturbance of a servo system.

The nature, principle and utility of this invention will become more apparent from the following detailed description when read in conjunction with the accompanying drawings in which like parts are designated by like reference numerals or characters.

DETAILED DESCRIPTION OF THE INVENTION

Figure 1:
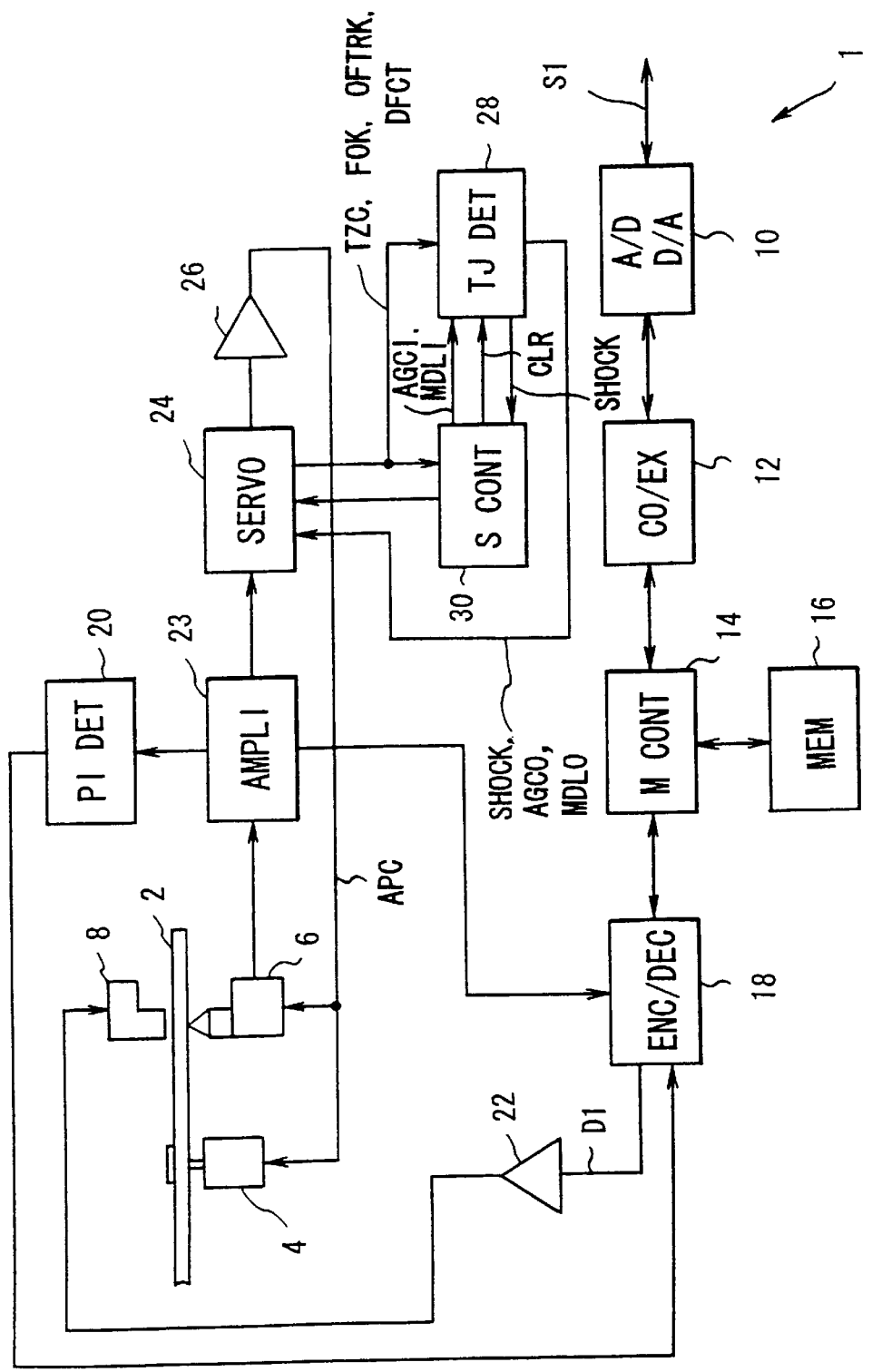
FIG. 1 is a block diagram showing an optical disc apparatus according to an embodiment of this invention.

Preferred embodiments of this invention will be described with reference to the accompanying drawings:

In FIG. 1, 1 designates an optical disc apparatus as a whole and an audio signal S1 is recorded on and reproduced from an optical magnetic disc 2.

More specifically, the optical magnetic disc 2 has a spiral pregroove formed previously thereto so that recording information is sequentially recorded thermo magnetically using the pregroove as a reference. Further, in the optical magnetic disc 2 the pregroove is formed in a wobbling form so that an absolute address on the optical magnetic disc 2 can be detected by detecting the wobbling and demodulating the detected result.

The optical disc apparatus 1 drives in rotation the optical magnetic disc 2 under the condition of a constant linear velocity by using a spindle motor 4 to drive an optical pick-up 6 and a magnetic head 8 in this state to thereby record the audio signal S1.

More specifically, in the optical disc apparatus 1, when information is recorded, the audio signal S1 is converted into a digital signal by an analog-to-digital conversion (A/D) digital-to-analog conversion (D/A) circuit 10 and then compressed by a compression/expansion circuit 12.

Further, the compression/expansion circuit 12 supplies an audio data to a memory control-circuit 14 to thereby sequentially store the audio data to a memory circuit 16 with a large capacity as well as sequentially read and output the audio memory data.

When information is recorded, an encoder/decoder 18 sequentially receives the audio memory data from the memory circuit 16 through the memory control circuit 14 and divides the audio memory data into predetermined block units.

Further, the encoder/decoder 18 adds address data to each of the divided blocks in accordance with the address data of the pregroove detected through a position information detection circuit 20 to thereby generate recording information D1.

With this arrangement, the optical disc apparatus 1 drives the magnetic head 8 in accordance with the recording information D1 supplied to a magnetic head drive circuit 22.

In this state, the optical disc apparatus 1 drives the optical pick-up 6 and irradiates a light beam L1 to the optical magnetic disc 2 so that the recording information D1 is recorded to the optical magnetic disc 2 by the application of a thermo magnetically recording method.

Here, as shown in FIGS. 2A to 2D, the optical disc apparatus 1 records the recording information D1 in the block unit (FIG. 2A) so as to divide the optical magnetic disc 4 into predetermined cluster units and records the recording information D1.

Figure 2:
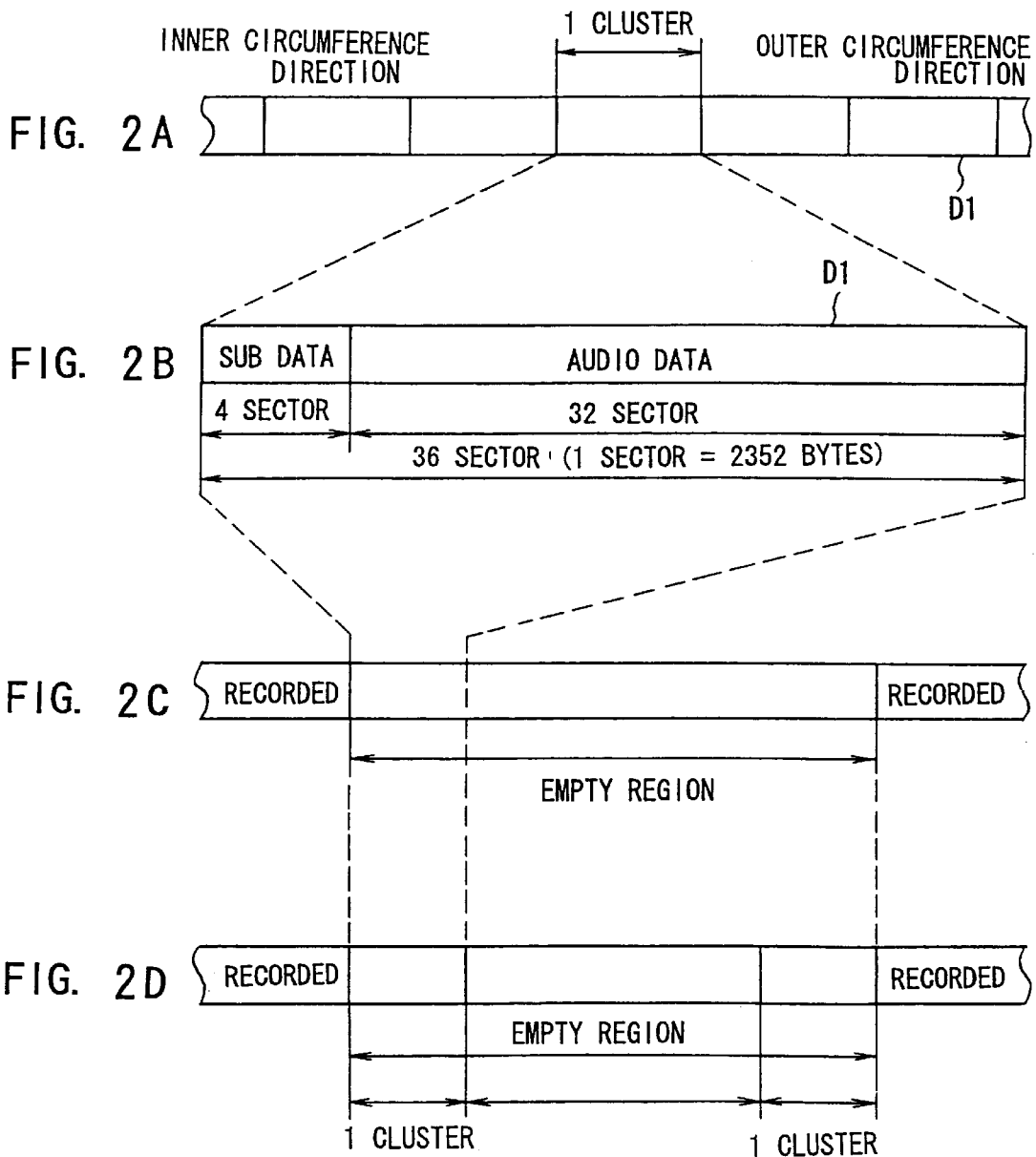
FIGS. 2A to 2D are schematic diagrams showing a structure of data on an optical disc.

Note, in the optical disc apparatus 1 each cluster is divided into 36 sectors and recorded sub-data to the leading 4 sectors, and thus address data and the like are assigned and recorded to the sub-data and audio data is recorded to the 32 sectors following-to the 4 sectors (FIG. 2B).

More specifically, the reflected light of the light beam is detected by the optical pick-up 6 to thereby receive a light receiving result whose signal level is changed in accordance with the wobbling of the pregroove, amplify the light receiving result through an amplifying circuit 23 and output the same to the position information detection circuit 20.

The position information detection circuit 20 detects address data and outputs the same to the encoder 18 by demodulating the light receiving result.

Further, the optical pick-up 6 outputs the light receiving result to a servo circuit 24 which controls the spindle motor 4 based on the light receiving result through an amplifying circuit 26 as well as controls the tracking and focusing of the optical pick-up 6.

With this arrangement, the optical disc apparatus 1 can sequentially form a recording track along the pregoove of the optical magnetic disc 2 and record the audio signal S1 in the cluster unit.

When the audio signal S1 is recorded, the optical disc apparatus 1 detects an empty region to which information can be recorded by reproducing the TOC region (Table of Contents) located at the innermost circumference of the optical magnetic disc 2 and records the recording information to the empty region.

Further, when the recording information is recorded to the empty region, the optical disc apparatus 1 defines unrecorded regions for a single cluster in front of and behind the empty region, and thus even if a tracking jump occurs, the deletion by mistake of the recorded data can be prevented.

More specifically, as shown in FIG. 2C, when the recording information is recorded to the entire empty region and a tracking jump occurs in the midway of the recording, there may be a possibility that the recorded data in front of and behind the empty region may be erased.

In this case, the recorded data in front of and behind the empty region may not be recorded again and in this case precious data is lost.

Whereas, as shown in FIG. 2D, when the unrecorded regions for the single cluster are defined in front of and behind the empty region, if it is possible that a quantity of light of the light beam can be changed to the quantity of light for reproduction by making use of the period of time during which the light beam jumps the unrecorded region and enters the recorded region in front of or behind the empty region, the erasing by mistake of the recorded data recorded to the recorded regions in front of and behind the empty region can be prevented before it arises.

With this arrangement, the deletion of recorded data by mistake can be prevented.

On the other hand, when tracking jump occurs in the empty region, the audio signal S1 can be recorded without discontinuity in such a manner that the tracking jump is detected in a short time and the audio signal S1 is recorded again.

Therefore, in the optical disc apparatus 1, a tracking jump is detected by a tracking jump detection circuit 28 based on a signal output from the servo circuit 24 and the overall operation is changed by a system control circuit 30 based on the detected result.

With this arrangement, the optical disc apparatus 1 can prevent the erasing by mistake of recorded data before it arises so that the audio signal S1 can be recorded without discontinuity.

Note, when information is recorded, the optical disc apparatus 1 reduces the quantity of the light beam and receives the reflected light thereof and the light receiving result is processed by the decoder 18 through the amplifying circuit 23 to reproduce the audio data.

Further, in the optical disc apparatus 1, the reproduced audio data is output to the memory control circuit 14 so that it is output to the compression/expansion circuit 12 through the memory circuit 16, whereby audio jumping caused when a tracking jump arises can be prevented.

With this arrangement, in the optical disc apparatus 1, the audio signal recorded to the optical magnetic disc 2 can be reproduced in such a manner that data output from the compression/expansion circuit 12 is converted into an analog signal by the analog-to-digital conversion (A/D)/digital-to-analog-conversion circuit (D/A) 10 and then output.

(2) Tracking Jump Detection Circuit

Figure 3:
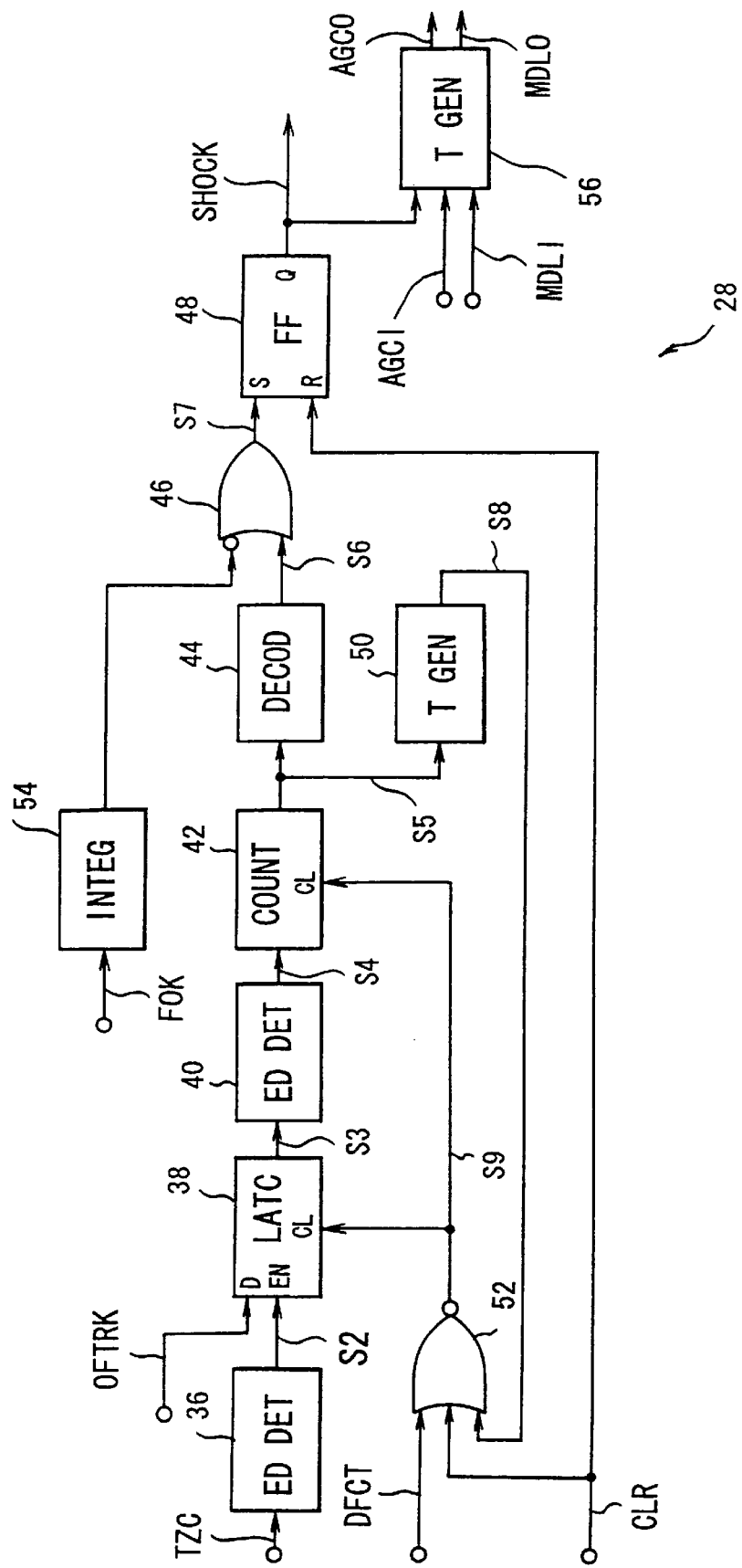
FIG. 3 is a block diagram showing a tracking jump detection circuit.

In the tracking jump detection circuit 28, as shown in FIG. 3, a track zero-crossing signal TZC is input to an edge detection circuit 36 to detect the edge of the track zero-crossing signal TZC.

Figure 4:
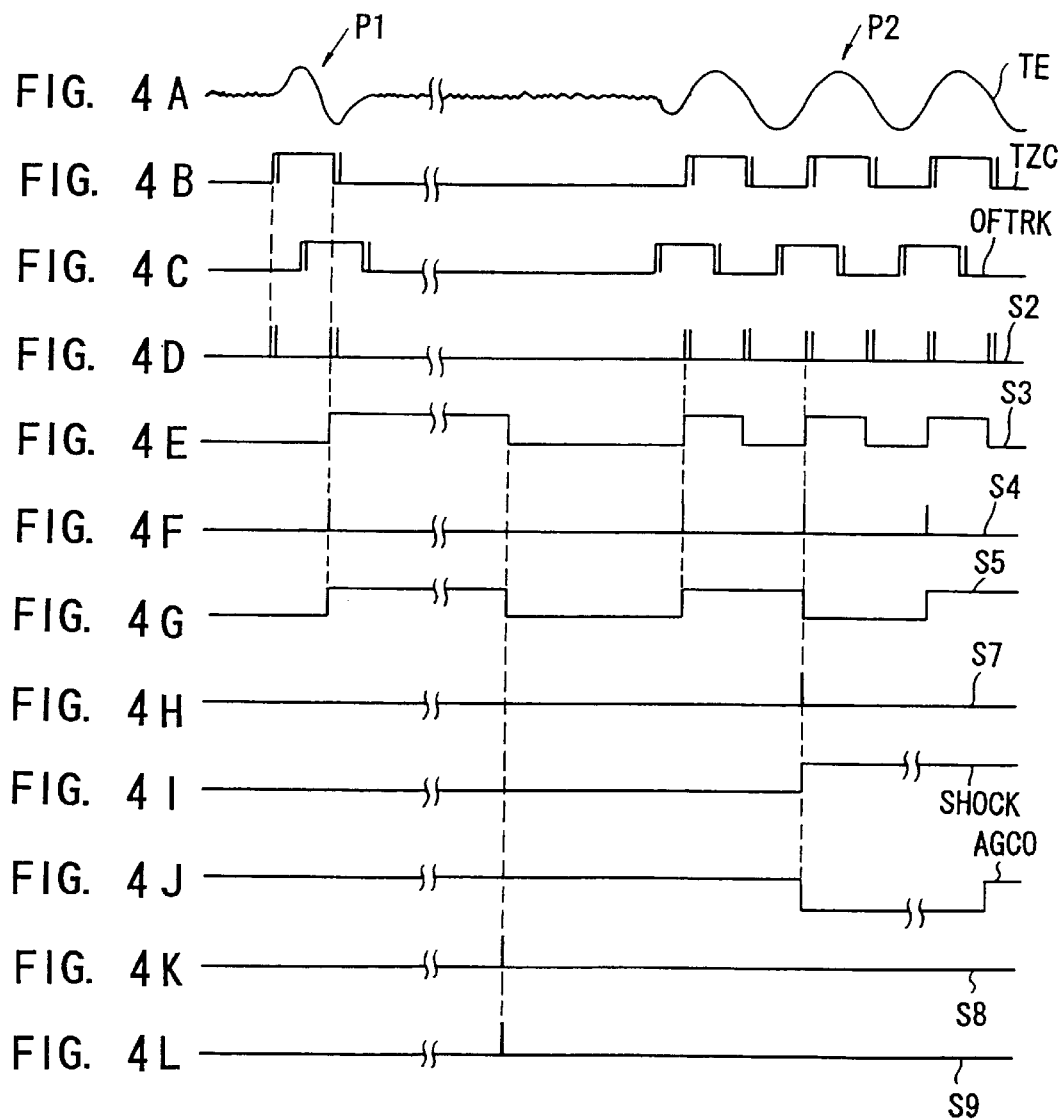
FIGS. 4A to 4L are signal waveform diagrams of respective output terminals of the tracking jump detection circuit.

As shown in FIGS. 4A to 4L, the track zero-crossing signal TZC is generated in such a manner that a tracking error signal TE (FIG. 4A) is input in the servo circuit 24 to a comparison circuit with a comparison reference set to a zero level (FIG. 4B).

The edge detection circuit 36 generates an edge detection signal S2 (FIG. 4D) having a signal level rising up in a pulse shape in response to the rising-up of the signal level of the track zero-crossing signal TZC.

A latch circuit 38 latches an off-track signal OFTRK (FIG. 4C) in response to the rising-up of-the edge detection signal S2 and outputs the latching result S3 (FIG. 4E) to an edge detection circuit 40.

Here, the off-track signal OFTRK is generated by the servo circuit 24 based on the receiving result of the reflected light so that when the irradiating position of the light beam is dislocated from the pregroove, the signal level of the off-track signal OFTRK rises up. The tracking jump detection circuit 28 removes the noise of the off-track signal OFTRK by latching the same by using the edge detection signal S2 as a reference.

The edge detection circuit 40 detects and outputs a detecting pulse S4 (FIG. 4F) corresponding to the rising-up edge of a latching result S3, so that a counter 42 counts the rising-up edge.

With this arrangement, in the tracking jump detection circuit 28, the counter 42 can detect the number of dislocation of trackings.

More specifically, in the tracking jump detection circuit 28, the counting result is decoded by the decoder 44, and thus when the value of the counting result S5 (FIG. 4G) becomes "2", the signal level of an output signal S6 rises up.

An OR circuit 46 outputs the output signal S7 (FIG. 4H) through a flip-flop circuit 48, whereby the tracking jump circuit 28 outputs the signal output from the flip-flop circuit 48 as a tracking jump detection signal SHOCK (FIG. 4I).

At this time, in the tracking jump detection circuit 28, a timing generation circuit 50 detects the rising-up of the output signal S5 of the counter 42 and delays the rising-up thereof by a predetermined period and outputs the same to an OR circuit 52 as a clearing pulse S9 (FIG. 4L). Therefore, the OR circuit 52 clears the latch circuit 38 and the counter 42 in response to the signal output S8 (FIG. 4K) from the timing generation circuit 50 (FIG. 4L).

With this arrangement, when the off-track signal OFTRK rises up by a single cycle as shown in FIG. 4A by a symbol P1, the tracking jump detection circuit 28 keeps the signal level of the tracking jump detection signal SHOCK to a logic "L" level, whereas when the off-track signal OFTRK continuously rises up by a two cycles or more as shown by a symbol P2, the tracking jump detection circuit 28 causes the signal level of the tracking jump detection signal SHOCK to rise up.

More specifically, in this embodiment, when recording information is recorded to each empty region, unrecorded regions for a cluster are formed in front of and behind the empty region.

In the optical magnetic disc, the cluster has a length corresponding to 3 tracks at the outermost circumference and a length corresponding to 7 tracks at the innermost circumference. The number of tracks of the inner circumference differs from that of the outer circumference, because the times of rotation at the inner circumference differs from that of the outer circumference, due to the controlling of the times of rotation of the disc to have a constant linear velocity at the head 6.

As a result, if a tracking jump can be detected before it jumps 3 tracks, the erasing by mistake of recorded data recorded in front of and behind the empty region can be prevented before it arises.

When the off-track signal OFTRK rises up for a single cycle only, however, it is contemplated that this is caused by dust, a scratch or the like.

Consequently, when the off-track signal OFTRK continuously rises up for two cycles in the optical disc apparatus 1, a tracking jump is detected, and thus the tracking jump is prevented from being detected by mistake and so can be securely and quickly detected. Then, a quantity of light of the light beam is changed based on the tracking jump detection signal SHOCK to prevent the erasing by mistake of recorded data.

At this time, the tracking jump detection circuit 28 inputs a defocusing signal FOK to an integration circuit 54 the signal level of which falls down when the light beam is defocused and the integrated result of the integration circuit 54 is inverted and input to the OR circuit 46. As a result, when the light beam is defocused longer than a predetermined period, the tracking jump detection signal SHOCK is controlled to rise up. With this arrangement, even if focusing is dislocated and recording information is not recorded, the recording information is recorded again.

Further, the tracking jump detection circuit 28 supplies to the OR circuit 52 a defect signal DFCT the signal level of which rises when a scratch or the like is detected on the optical magnetic disc 2, and when the defect signal DFCT rises up, the latch circuit 38 and the counter 42 are cleared.

With this arrangement, the optical disc apparatus 1 prevents a tracking jump from being detected by mistake by a scratch or the like.

Further, at this time, in the tracking jump detection circuit 28, when the system control circuit 30 changes a quantity of light of the light beam, the latch circuit 38 and the counter 42 are cleared in response to a clear signal CLR output from the system control circuit 30. With this arrangement, a tracking jump is prevented from being detected by mistake for a period until a rerecording operation is started.

(3) System Control Circuit

Figure 5:
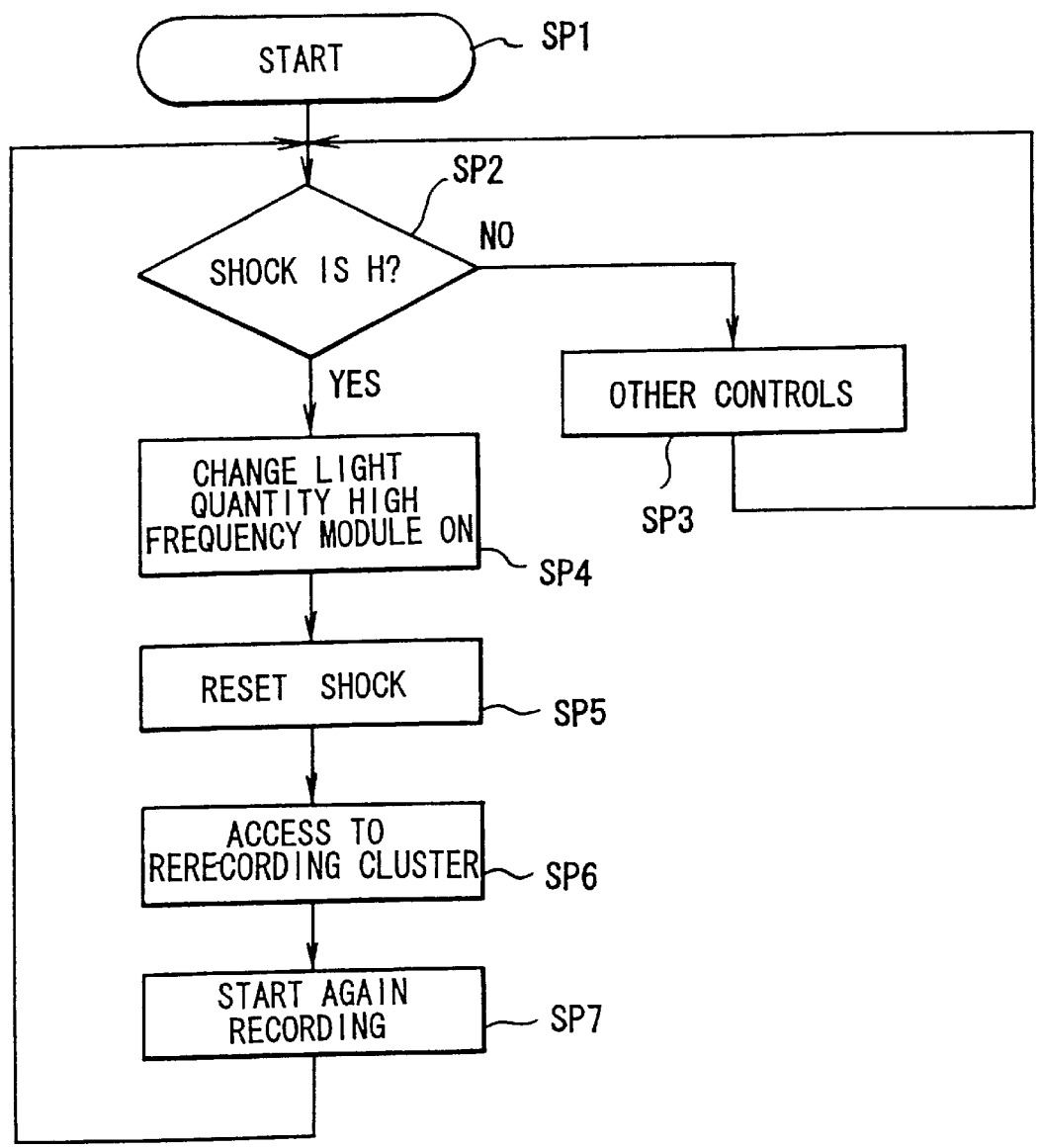
FIG. 5 is a flowchart explaining the operation of a system control circuit.

While information is recorded, the system control circuit 30 (FIG. 1) executes the procedure shown in FIG. 5 when the tracking jump detection signal SHOCK rises up to thereby rerecord the recording information D1 into the cluster unit.

More specifically, the system control circuit 30 goes to step SP2 from step SP1 to determine whether or not the tracking jump detection signal rises up, and when a negative result is obtained here, the system control circuit 30 goes to step SP3 to execute other necessary processing and then returns to step SP2.

On the other hand, when an affirmative result is obtained at step SP2, the system control circuit 30 goes to step SP4 to change the signal level of a control signal D11 to be output to an APC circuit 59 (FIG. 6) to thereby change a quantity of light of the light beam L1 to the quantity for production.

Figure 6:
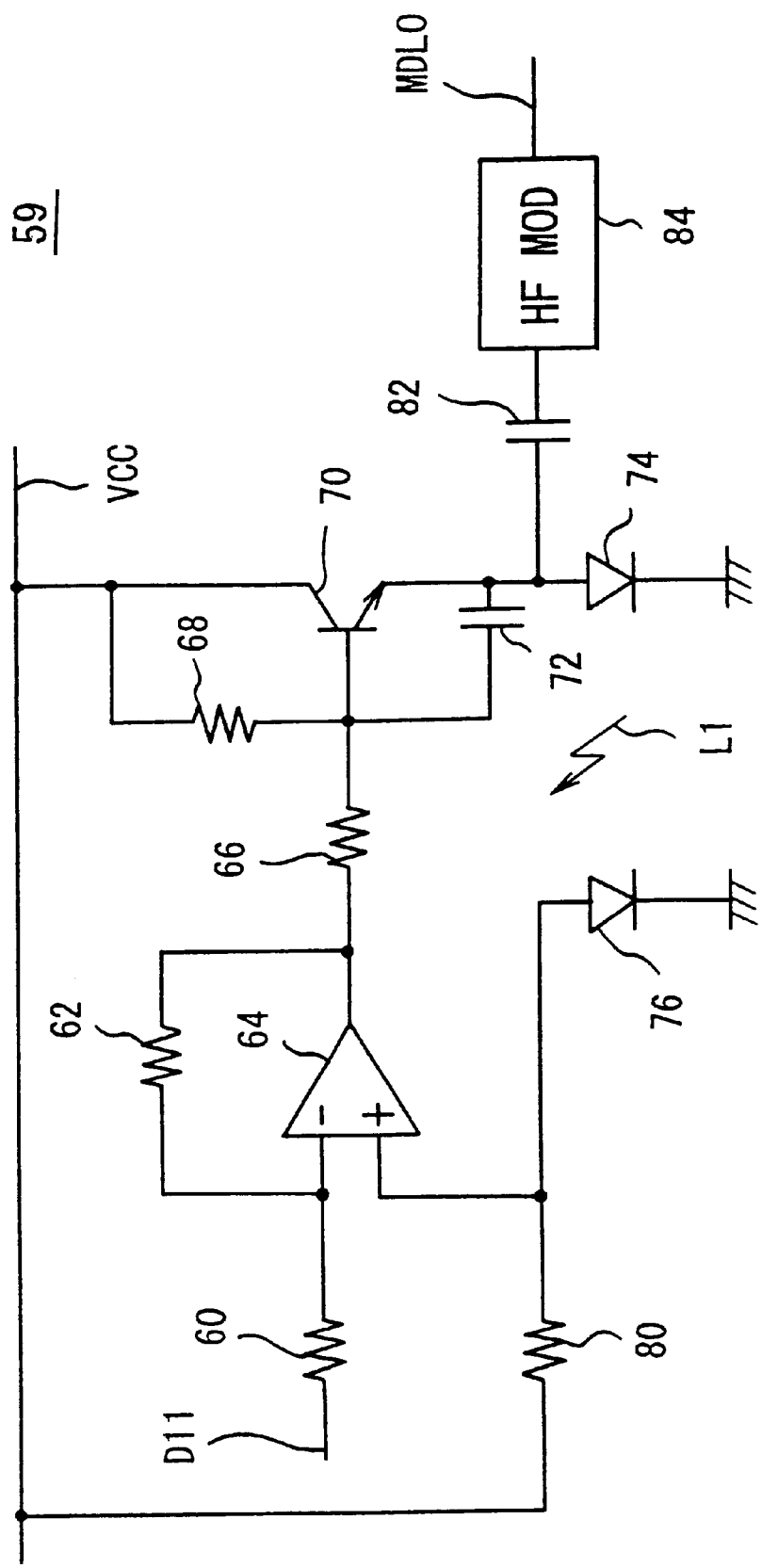
FIG. 6 is a block diagram illustrating an APC (auto power control) circuit.

Here, as shown in FIG. 6, in the APC circuit 59, the control signal D11 contained in the servo circuit 24 and output from the system control circuit 30 is input to the inverted input terminal of an operational amplifier circuit 64 through an input resistor 60 and the monitored result of the light beam L1 formed by a resistor 80 and a photodetector 76 is input to the non-inverting input terminal of the operational amplifier circuit 64.

The operational amplifier circuit 64 is composed of a differential amplifier circuit having a feedback resistor 62 and detects an error component of the monitored result to the control signal D11, and thus a transistor 70 is driven by the detected result.

More specifically, the transistor 70 has a resistor 68 connected between the base and collector thereof and a capacitor 72 connected between the base and emitter thereof, respectively, receives a signal output from the operational amplifier circuit 64 through a resistor 66 and drives a laser diode 74 by an output from the emitter.

The photodetector 76 separates and receives a portion of the light beam L1 output from the laser diode 74, and thus the APC circuit 59 can keep a quantity of light of the light beam L1 to be irradiated to the optical magnetic disc 2 to that determined by the control signal D11.

With this arrangement, when the tracking jump detection signal SHOCK rises up, the optical disc apparatus 1 changes a quantity of light of the light beam L1 to the quantity for reproduction by changing the signal level of the control signal D11 to thereby prevent the erasing by mistake of recorded data before it arises.

At the same time, the system control circuit 30 outputs control data MDLO to a high frequency module 84 to enable the operation thereof. More specifically, in this type of the optical disc apparatus, the light beam L1 is modulated by a high frequency signal having a predetermined frequency to reduce scoop noise in reproduction.

Consequently, in this type of the APC circuit, when information is reproduced, a driving modulation signal is generated by the incorporated high frequency module 84 and outputs to the laser diode 74 through a capacitor 82.

On the other hand, in the system control circuit 30, control data MDLI (FIG. 3) is generated to control the operation of the high frequency module 84, and in the case of this embodiment, an OR signal of the control data MDLI and tracking jump detection signal SHOCK is obtained by an incorporated timing generation circuit 56, and thus when the tracking jump detection signal SHOCK rises up, the high frequency module 84 is started not only in reproduction but also in recording.

With this arrangement, in the optical disc apparatus 1, when the address data of the optical magnetic disc is detected to rerecord the recording information, scoop noise is reduced and a rerecording position can be securely detected.

Figure 7:
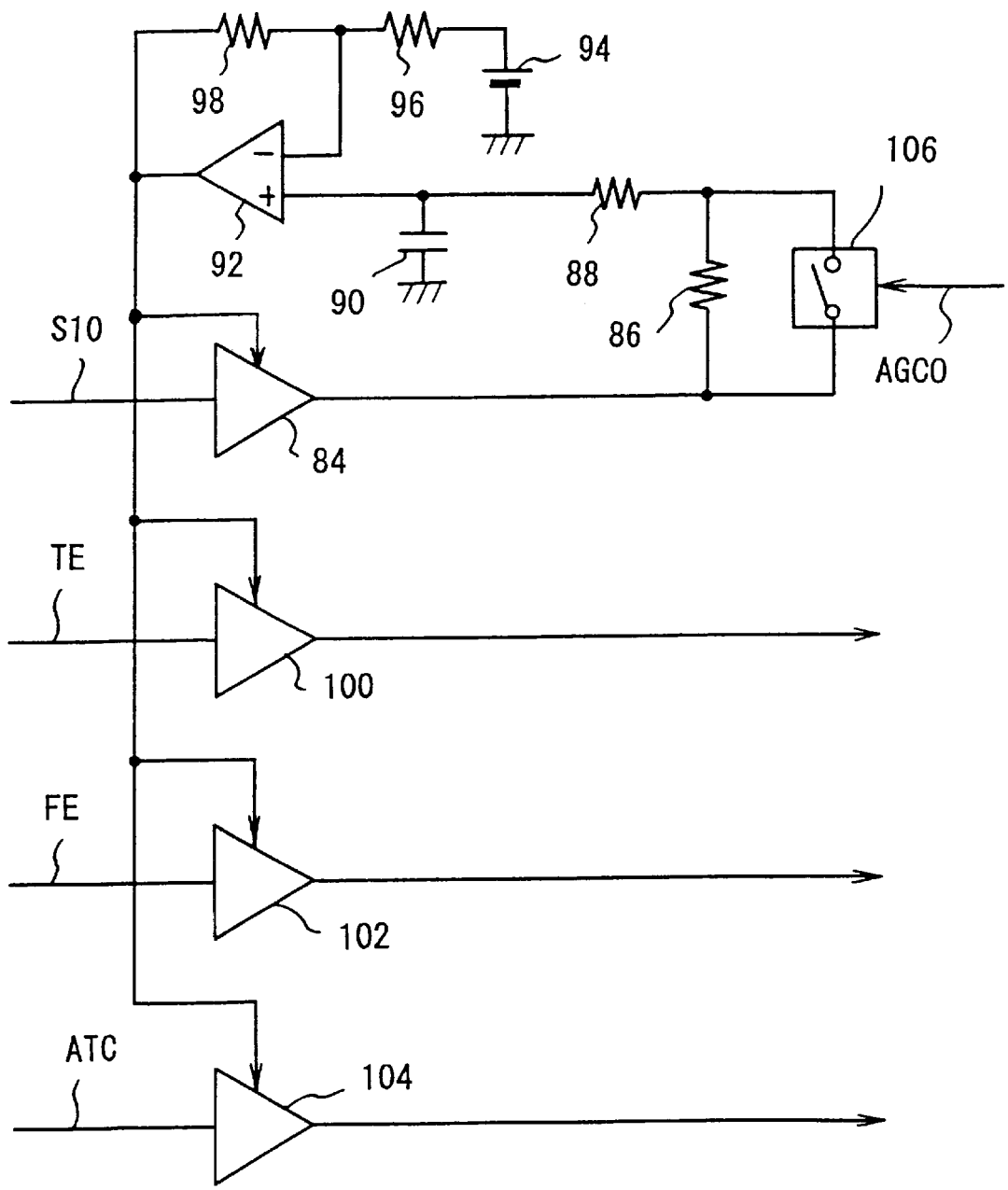
FIG. 7 is a block diagram illustrating an AGC (auto gain control) circuit.

Further, as shown in FIG. 7, in the system control circuit 30, the control data is output to the AGC circuit incorporated in the servo circuit 24 to thereby reduce the time constant of the AGC circuit for a predetermined period.

More specifically, the optical disc apparatus 1 receives a reflected light from the optical magnetic disc by using a light receiving element having a light receiving surface divided into square sections and a light beam having planes of polarization perpendicular to each other can be received between adjacent light receiving surfaces, respectively.

With this arrangement, the optical disc apparatus 1 generates a reproduction signal, focusing error signal FE and the like by generating a difference signal of each light receiving surface in such a manner that a signal output from the light receiving element is processed by the servo circuit 24.

The servo circuit 24 generates a light quantity detection signal S10 the signal level of which is changed in accordance with a quantity of light of the reflected light beam by adding the signal output from the light receiving element and the AGC circuit input the light quantity detection signal S10 to the amplifying circuit 84.

The amplifying circuit 84 amplifies the light quantity detection signal S10 by a predetermined gain and then inputs the same to an error amplifying circuit 92 through a series circuit composed of resistors 86 and 88 the other end of which is grounded through a capacitor 90.

The light quantity detection signal S10 is input to the non-inverting input terminal of the error amplifying circuit 92, whereas the inverting input terminal thereof is connected to a reference power supply 94 through a resistor 96 and a signal output from the error amplifying circuit 92 is fed back to the inverting input terminal through a feedback resistor 98.

The error amplifying circuit 92 detects the signal level of the light quantity detection signal S10 by using the reference power supply 94 as a reference and controls the gain of the amplifying circuits 84 to 104 in response to the detected result of the signal level.

The amplifying circuit 100 amplifies and outputs a tracking error signal TE, whereas the amplifying circuit 102 amplifies and outputs a focusing error signal FE.

On the other hand, the amplifying circuit 104 amplifies and outputs a detection signal ATC (detected by a dedicated light receiving element) the signal level of which is changed following to the wobbling of the pregroove.

With this arrangement, the error amplifying circuit 92 corrects the signal level of the tracking error signal TE and the like by using the signal level of the light quantity detection signal S10 as a reference. As a result, even if the optical magnetic disc 2 having a difference reflecting ratio is mounted and a quantity of a reflected light is changed, a tracking control and the like can be securely executed. Actually, although the optical magnetic disc has a feature that its reflecting ratio is greatly different depending upon the manufacturer thereof, the tracking control and the like can be securely executed by correcting the signal level of the tracking error signal TE and the like by using the signal level of the light quantity detection signal S10 as the reference as in this embodiment.

When a quantity of light of the light beam L1 is changed to the quantity of light for reproduction while recording as in this embodiment, however, a quantity of light of the reflected light beam is greatly changed.

On the other hand, in this type of the AGC circuit, when a quantity of light is changed by controlling the gain by the predetermined time constant, the signal level of the respective signals is greatly changed accordingly and thus a time is necessary for the change to converge.

If this state is left as it is, a longer time is needed to detect the address data and the like necessary for rerecording.

To cope with this problem in the AGC circuit, the time constant for controlling the gain is reduced by short-circuiting the opposite ends of the resistor 86 by a switching circuit 106.

In correspondence to this arrangement, the system control circuit 30 generates a control signal AGCI (FIG. 3) for turning the switching circuit 106 to an ON state when a mode is changed, and in this embodiment, the control data AGCI is ORed with the tracking jump detection signal SHOCK by the incorporated timing generation circuit 56, and thus the switching circuit 106 can be turned to the ON state not only when the mode is changed but also when the tracking jump detection signal SHOCK rises up.

With this arrangement, in the optical disc apparatus 1, a quantity of light of the light beam L1 is changed to the quantity of light for reproduction to quickly execute rerecording.

More specifically, the system control circuit 30 goes to step SP5 (FIG. 5) next and sends a clear signal CLR to the tracking jump detection circuit 28 to thereby prevent the detection by mistake of a tracking jump for a period during which the light beam is sought to an original recording track to execute rerecording.

Next, the system control circuit 30 goes to step SP6 and detects the leading position of a cluster located just in front of the cluster executing recording when the tracking jump detection-signal SHOCK rises up and rerecords the recording information from the cluster at next step SP7.

At this time, the optical disc apparatus 1 controls the memory control circuit 14 and outputs again the audio data accumulated in the memory circuit 16, and thus the recording information D1 is created so that the audio data is continued in front of and behind the tracking jump.

(4) Effects of the Embodiment

According to the above arrangement, when the off-track signal OFTRK continuously rises up for two cycles, it is determined that tracking jump arises. As a result, the detection by mistake of the tracking jump is prevented and the tracking jump can be securely and quickly detected, and thus the erasing by mistake of recorded data can be prevented by changing a quantity of light of the light beam in response to a tracking jump detection signal.

(5) Other embodiments

Note, although the above embodiment describes the case in which when the off-track signal OFTRK continuously rises up for two cycles, it is determined that tracking jump arises, this invention is not limited thereto but this setting may be optionally selected when necessary.

Further, although the above embodiment describes the case in which tracking jump is detected and rerecorded while recording, this invention is not limited thereto but tracking jump may be also detected while reproducing to prevent the jumping of an audio signal.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical disc apparatus comprising:
   an optical pick-up for irradiating a light beam onto a disc recording medium, and recording information to said disc recording medium;

tracking error signal generating means for generating a tracking error signal responsive to a magnitude of a portion of said light beam which is reflected from said disc;

comparing means for comparing said tracking error signal with a predetermined reference level and generating an output signal when said tracking error signal and said reference signal are in a predetermined condition relative to each other;

off-track signal generating means for generating an off-track signal the level of which is changed when said light beam is dislocated from the track;

latch means for latching said off-track signal responsive to the output signal from said comparing means and outputting a latched off-track signal;

count means, coupled to receive the latched off-track signal, for outputting a count signal indicating the number of latched off-track signals received;

reset means for initializing said count means and said latch means;

a decoder coupled to receive the count signal and output a tracking-jump detection signal responsive to said count signal being more than a predetermined value; and control means for changing a magnitude of the light beam of said optical pick-up responsive to said tracking-jump detection signal.

2. The optical disc apparatus of claim 1 wherein the reset means comprises:

timing signal generating means coupled to receive the count signal for generating a reset signal which will initialize said count means and said latch means if a predetermined time period elapses between count signals; and scratch detecting means for detecting a scratch on said disc recording medium responsive to said reflected light, and outputting a scratch detection signal when said light beam is scanned on said scratch.

3. The optical disc apparatus of claim 1 further comprising:

defocus detecting means for generating a defocus signal responsive to a comparison between the magnitude of said light beam reflected from said disc and a predetermined reference value;

means for integrating said defocus signal and outputting an integrated defocus signal; and wherein said decoder outputs said tracking-jump signal responsive to both said count signal and said integrated defocus signal.

4. The optical disc apparatus of claim 1 further comprising;

light quantity change means for changing the light quantity of said light beam; and light beam modulating means for modulating said light beam at a predetermined frequency.

5. The optical disc apparatus of claim 2 wherein either of said scratch detection signals from said scratch detecting means or said reset signal from said timing signal generation means initializes said count means and said latch means.

6. The optical disc apparatus of claim 4 wherein;

said control means controls said light quantity change means and light beam modulating means.

7. The optical disc apparatus of claim 4 wherein;

said control means, responsive to said tracking jump detection signal, controls said light quantity change means to cause the magnitude of said light beam to be at a level for reproduction and also starts to drive said light beam modulation means.

8. The optical disc apparatus of claim 4 further comprising:

signal level correcting means for correcting the signal level of respective error signals based on the light quantity of said reflected light, said signal level correcting means having a time constant;

time constant change means for changing the time constant of said signal level correcting means; and wherein said control means controls said time constant change means to chance said time constant and controls the light quantity of said light beam.

9. A data erasure preventing circuit for an optical disc apparatus in which a light beam is irradiated onto a disc recording medium to record information thereupon, said circuit comprising:

count means for counting a number of off-track signals occurring within a predetermined period of time and outputting a count value;

comparing means for comparing the count value within said predetermined period of time with a predetermined value;

tracking jump detection signal generating means for generating a tracking jump detection signal responsive to said comparing means when said count value is larger than the predetermined value; and control signal generating means for generating a first signal which changes the light quantity of the light beam responsive to said tracking jump detection signal, and a second signal which controls a light beam modulating means for modulating said light beam at a predetermined frequency.

10. The circuit of claim 9 wherein said means for generating said tracking jump detection signal is also responsive to a defocus signal.

11. The circuit of claim 9, further comprising:

means for detecting a scratch on said disc recording medium based on said reflected light, and resetting said count value responsive to a detected scratch.

12. A method for detecting a shock to a light beam of an optical pick-up during a recording operation, comprising the steps of:

detecting a tracking error signal;

detecting an off-track signal;

generating a tracking jump detecting signal when said tracking error signal and said off-track signal are simultaneously detected a predetermined number of times within a predetermined time period;

switching a light quantity of said light beam from a light quantity for recording to a light quantity for reproduction, and enabling the operation of light beam modulating means when said tracking jump detection signal is detected;

moving the optical pick-up to a position to start rerecording; and changing the light quantity of the light beam to the light quantity for recording, and changing said light beam modulating means to a condition to start rerecording.

* * * * *

UNITED STATES PATENT AND TRADEMARK OFFICE
CERTIFICATE OF CORRECTION

PATENT NO. : 6,256,274 B1
DATED : July 3, 2001
INVENTOR(S) : Yuji Arataki et al.

It is certified that error appears in the above-identified patent and that said Letters Patent is hereby corrected as shown below:

Column 1,
Line 26, delete "to".
Line 31, change "atracking" to -- a tracking --.
Line 65, delete "it is considered".

Column 3,
Line 30, change "includes-signal" to -- includes signal --.

Column 5,
Line 8, change "following-to" to -- following to --.

Column 12,
Line 17, change "chance" to -- change --.

Signed and Sealed this

Twenty-sixth Day of February, 2002

Attest:

Attesting Officer

JAMES E. ROGAN
Director of the United States Patent and Trademark Office